(12) United States Patent
Keita et al.

(10) Patent No.: US 6,887,401 B2
(45) Date of Patent: May 3, 2005

(54) METHOD FOR MAKING TRANSPARENT POLYTHIOURETHANE SUBSTRATES IN PARTICULAR OPTICAL SUBSTRATES

(75) Inventors: Gabriel Keita, Oldsmar, FL (US); Joey O. Obordo, Seminole, FL (US); Pamela Anne McClimans, Safety Harbor, FL (US); Yassin Yusef Turshani, Largo, FL (US)

(73) Assignee: Essilor International Compagnie General d'Optique, Charenton Cedex (FR)

( * ) Notice: Subject to any disclaimer, the term of this patent is extended or adjusted under 35 U.S.C. 154(b) by 391 days.

(21) Appl. No.: 10/012,727

(22) Filed: Nov. 5, 2001

(65) Prior Publication Data

US 2003/0125410 A1 Jul. 3, 2003

(51) Int. Cl.$^7$ .......................... B29D 11/00; G02B 3/00; B29C 39/24; C08L 75/12; C08G 18/70
(52) U.S. Cl. .................. 264/1.1; 264/1.32; 264/240; 106/169.4; 525/457; 525/458; 528/67
(58) Field of Search ............................ 264/1.1, 1.24, 264/1.29, 1.32, 240; 106/169.4; 522/92, 97; 524/198; 525/457, 458; 528/67

(56) References Cited

U.S. PATENT DOCUMENTS

| | | | |
|---|---|---|---|
| 4,662,376 A | | 5/1987 | Belanger ................... 128/361 |
| 4,775,733 A | | 10/1988 | Kanemura et al. ............ 528/67 |
| 4,975,328 A | | 12/1990 | Hirose et al. ................ 428/413 |
| 5,679,756 A | * | 10/1997 | Zhu et al. ..................... 528/65 |
| 5,908,876 A | | 6/1999 | Fujii et al. ................... 522/142 |
| 5,932,681 A | * | 8/1999 | Herold et al. ................. 528/81 |
| 5,973,098 A | | 10/1999 | Keita et al. ................... 528/65 |
| 6,019,915 A | * | 2/2000 | Fujii et al. ................. 264/1.36 |
| 6,309,568 B1 | * | 10/2001 | Yang et al. ................... 264/1.7 |

FOREIGN PATENT DOCUMENTS

| | | |
|---|---|---|
| DE | 2603800 | 8/1976 |
| DE | 4017940 | 12/1991 |
| EP | 0271839 | 6/1988 |
| EP | 0394495 | 10/1990 |
| EP | 0802208 | 10/1997 |

* cited by examiner

*Primary Examiner*—J. A. Lorengo
(74) *Attorney, Agent, or Firm*—Fulbright & Jaworski, L.L.P.

(57) ABSTRACT

A method of fast curing polythiourethane transparent casted substrate, usable for making optical articles such as ophthalmic lenses, which comprises the steps of:

1) Providing a first component A comprising a polythiourethane prepolymer having isocyanate or isothiocyanate end groups and a viscosity at 25° C. ranging from 0.02 to 0.4 Pa.s;
2) Providing a second component B comprising a polythiourethane prepolymer having thiol (SH) end groups and a viscosity at 25° C. ranging from 0.2 to 2.0 Pa.s;
3) Mixing together first and second components A and B and filling a moulding cavity of a casting mould assembly with the resulting mixture;
4) Curing said mixture to obtain a transparent solid substrate, said curing step comprising:
   a) a first step for polymerizing said mixture to obtain a gel within 1 to 10 minutes; and
   b) a second step of post-curing the gel to obtain the transparent solid substrate; and
5) Recovering the transparent solid substrate from the mould.

22 Claims, No Drawings

METHOD FOR MAKING TRANSPARENT POLYTHIOURETHANE SUBSTRATES IN PARTICULAR OPTICAL SUBSTRATES

BACKGROUND OF THE INVENTION

1. Field of the Invention

The present invention relates to a method for making polythiourethane substrates and in particular optical substrates such as ophthalmic lenses.

More specifically, the present invention relates to a method for making polythiourethane based optical substrates such as ophthalmic lenses having a high refractive index $n_D^{25}$ of 1.60, preferably of 1.65 and more preferably of 1.67 or more which are substantially free from optical defects such as bubbles and/or striations resulting from the polymerization process.

2. Description of the Prior Art

Polythiourethane substrates such as ophthalmic lenses are typically made by filling a moulding cavity with a liquid mixture of appropriate monomers, such as a mixture of a polyisocyanate and a polythiol, polymerizing the monomer mixture and thereafter recovering the polymerized polythiourethane substrates from the mould.

One major problem associated with these prior art moulding methods, especially for making optical substrates such as ophthalmic lenses, is the obtention of a defect free substrate, in particular free from striations.

If the liquid monomer mixture is of relatively low viscosity, i.e. less than $3.10^{-3}$ Pa.s at 25° C., time to gelation is relatively long. In that case, local heat points appearing within the mixture during polymerization create convection currents resulting in the so-called "convection induced striations" within the final polymerized substrate.

The rate of formation of such convection induced striations increases when the mixture viscosity decreases.

On the other hand, the mere filling of the mould cavity with the monomer mixture creates the so-called "filling induced striations". The relaxation time necessary to eliminate such filling induced striations increases with the increase of the monomer mixture viscosity.

Furthermore, when using monomer mixtures of relatively high viscosity, air bubbles which may be entrapped within the liquid monomer mixtures are difficult to eliminate.

Thus, the aim of the present invention is to provide a method of fast curing a polythiourethane transparent casted substrate which remedies to the drawbacks of the prior art methods.

Another object of the invention is to provide a method of fast curing polythiourethane transparent casted substrates substantially free from optical defects, in particular free from convection and/or filling induced striations.

SUMMARY OF THE INVENTION

The present invention provides a method of fast curing polythiourethane transparent casted substrate substantially free from optical defects, usable for making optical articles such as ophthalmic lenses, which comprises the steps of:

1) Providing a first component A comprising a polythiourethane prepolymer having isocyanate or isothiocyanate (NCX where X is O or S) end groups, preferably isocyanate end groups, and a viscosity at 25° C. ranging from 0.02 to 0.4 Pa.s;
2) Providing a second component B comprising a polythiourethane prepolymer having thiol (SH) end groups and a viscosity at 25° C. ranging from 0.2 to 2.0 Pa.s;
3) Mixing together first and second components A and B and filling a moulding cavity of a casting mould assembly with the resulting mixture;
4) Curing said mixture to obtain a transparent solid substrate, said curing step comprising:
   a) a first step of polymerizing said mixture to obtain a gel within 1 to 10 minutes; and
   b) a second step of post-curing the gel to obtain the transparent solid substrate; and
5) Recovering the transparent solid substrate from the mould.

The present invention is also directed to preparation methods of first and second components A and B.

The present invention is further directed to a defect free optical article, especially an ophthalmic lens, manufactured by the above defined method.

DETAILED DESCRIPTION OF THE INVENTION

In the meaning of the present invention, a gel designates the reaction product of components A and B in which the conversion rate of the reactive functions ranges from 50 to 80% and preferably is about 70%.

Preferably, the first component A will have a molar ratio of the isocyanate or isothiocyanate groups to the thiol groups NCX/SH ranging from 4:1 to 30:1, preferably 6:1 to 10:1, whereas the second component B will have a molar ratio of the thiol groups to the isocyanate or isothiocyanate groups SH/NCX ranging from 4:1 to 30:1, preferably 6:1 to 10:1.

Preferably, gelation shall occur within 1 to 10 minutes.

Still preferably, the viscosity at 25° C. of the mixtures of components A and B ranges from 0.05 to 0.5 Pa.s, preferably from 0.1 Pa.s to 0.3 Pa.s.

The curing step of the mixture can be implemented using any well known polymerization technique and in particular ambient temperature or thermal polymerization including induction and infrared heating Preferably, the step of curing to obtain a gel is performed at ambient temperature (25° C.) (without heating).

Curing of the mixture is preferably performed in the presence of a catalyst. Any catalyst that promotes gelation of the mixture within 1 to 10 minutes may be used in the mixture in the usual quantities.

When using such a catalyst, it is preferably added, in the required amount, in second component B just before the preparation of the mixture of components A and B or in the mixture itself.

Among the catalyst that can be used in the method of the invention, there may be cited tertiary amines, such as triethylamine, organometallic compounds, such as dibutyltin dilaurate, and alkakine metals, alkaline earth metals, transition metals and ammonium salts of acids, these salts fulfilling the condition $0.5 \leq pKa \leq 14$.

These preferred latter salts are defined as salts of formula:

wherein, $M^{p+}$ is a cation selected from the group consisting of alkaline metals, alkaline earth metals, transitions metals and ammonium groups of formula $NR^+_4$ in which R is an alkyl radical, $Y^-$ is an anion such as the corresponding acid YH has a pKa fulfilling the condition $0.5 \leq pKa \leq 14$, p is the valency of the cation, and n=mxp.

Preferably, the catalyst consists solely in the salt or a mixture of these salts.

The preferred metallic cation of the salts are $Li^+$, $Na^+$, $K^+$, $R^{b+}$, $Mg^{2+}$, $Ca^{2+}$, $Ba^{2+}$ and $Al^{3+}$. The particularly preferred metallic cations are $Li^+$, $Na^+$ and $K^+$ due to their absence of color and solubility in the composition. Transition metals are less preferred because the salts thereof lead to coloured compositions and therefore coloured polymerized resins.

The preferred $NR^+_4$ groups are those in which R is a $C_1$–$C_8$ alkyl radical and more preferably, a methyl, ethyl, propyl, butyl or hexyl radical.

The salts shall be used in the polymerizable composition in an effective amount, i.e. an amount sufficient to promote the thermal or room temperature polymerization of the composition.

Generally, the salt will be present in amounts ranging, based on the total weight of the polymerizable monomers, from 5 to 2000 parts per million (ppm), preferably 10 to 500 ppm and more preferably 40 to 100 ppm.

Preferably, $Y^-$ is an anion such as the corresponding acid YH which fulfills the condition $0.5 \leq pKa \leq 10$ and more preferably $0.5 \leq pKa \leq 8$.

Preferably, the anion $Y^-$ is selected from the group consisting of thiocyanate, carboxylate, thiocarboxylate, acetylacetonate, diketone, acetoacetic ester, malonic ester, cyanoacetic ester, ketonitrile and anion of formula $RS^-$ wherein R is a substituted or non-substituted alkyl group or phenyl group.

Preferably, the alkyl group is a $C_1$–$C_6$ alkyl group, such as methyl, ethyl and propyl.

The preferred anions $Y^-$ are $SCN^-$, acetylacetonate, acetate, thioacetate, formate and benzoate.

The preferred salt is KSCN.

Generally, the salt will be present in amounts ranging, based on the total weight of the polymerizable monomers, from 0.001 to 2.5%, preferably 0.001 to 1%. Electron-donor compounds may be used in combination with the salt and are preferably selected from the group consisting of acetonitrile compounds, amide compounds, sulfones, sulfoxides, trialkylphosphites, nitro compounds, ethyleneglycol ethers, crown ethers and kryptates.

Examples of acetonitrile compounds are:

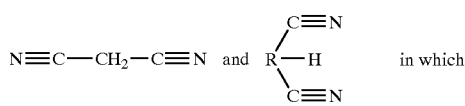

R is an alkyl group, preferably a $C_1$–$C_6$ alkyl group such as methyl, ethyl, propyl, butyl.

The amide compounds may be primary, secondary or tertiary amide compounds.

The trialkylphosphites and triarylphosphites may be represented by formula:

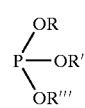

in which R, R', R''' are either an alkyl group, preferably a $C_1$–$C_6$ alkyl group or an aryl group such as a phenyl group. Preferred are trialkylphosphites, for example $(C_2H_5O)_3P$.

Electron-donor compounds may also be selected from crown ethers and kryptates.

These cyclic molecules are usually chosen to exhibit a good compromise between the heteroatom or metal size and the "cage" size, i.e. between the number of heteroatoms and the size and the "cage" size, i.e. between the number of heteroatoms and the size of the cycle.

The preferred crown ethers and kryptates may be represented by the following formulae:

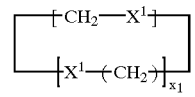

and

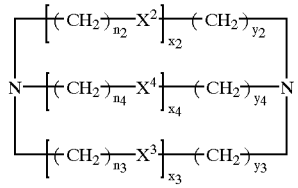

wherein $X^1$ represents O, S or NH, $x_1$ is an integer from 3 to 6, preferably from 3 to 4, $X^2$, $X^3$ and $X4$ represent O, S, $n_2$, $n_3$, $n_4$, $y_2$, $y_3$, $y_4$ are 2 or 3 $x_3$, $x_4$, are 2 or 3.

Among the preferred crown ethers and kryptates there may be cited the following compounds:

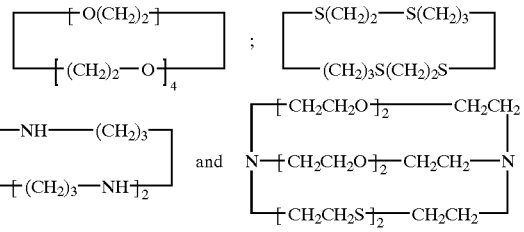

The electron-donor compounds are present, based on the total weight of the polymerizable monomers in amounts ranging from 0 to 5% by weight, preferably 0 to 1% by weight, and most preferably crown ethers such as 18-crown-6, 18-crown-7, 15-crown-5 and 15-crown-6.

The polymerizable mixture of the present invention preferably comprises a solvent for promoting the dissolution of the salt catalyst.

Any polar organic can be used such as acetonitrile, tetrahydrofurane or dioxane. Other suitable solvents are methanol, ethanol, thioethanol, acetone, acetonitrile and 3-methyl-2-butene-1ol.

The amount of solvent is generally kept below 2% by weight, based on the total weight of the polymerizable monomers present and preferably between 0 and 0.5% by weight, to avoid haze and bubbling.

The mixture according to the invention may also include additives which are conventionally employed in polymerizable compositions intended for moulding optical articles, in particular ophthalmic lenses, in conventional proportions, namely inhibitors, dyes, photochromic agents, UV absorbers, perfumes, deodorants, antioxidants, antiyellowing agents and release agents.

The perfumes allow the odour of the compositions to be masked, in particular during surfacing or routering operations.

In particular, usual UV absorbers such as those commercialized under the tradenames UV 5411®, UV 9®, Tinuvin400®, Tinuvin P®, Tinuvin 312®, Seesorb 701® and Seesorb 707® may be used in amounts generally up to 2% by weight of the total polymerizable monomers weight.

Also, the compositions of the invention preferably comprise a release agent in an amount up to 0.1% by weight of the total polymerizable monomers weight.

Among the release agents there may be cited mono and dialkyl phosphates, silicones, fluorinated hydrocarbon, fatty acids and ammonium salts. The preferred release agents are mono and dialkyl phosphates and mixtures thereof. Such release agents are disclosed interalia in document U.S. Pat. Nos. 4,662,376, 4,975,328 and EP-271.839.

The additives are preferably added to first component A prior to the mixing with second component B.

The mixing of component A with component B can be performed by any known mixing technique such as those mentioned in U.S. Pat. No. 5,973,098.

Preferably, components A and B to be mixed are added in a small reactor chamber and then mixed with a screw mixer.

Components A and B are prepared by polymerizing mixtures of required amounts of polyisocyanate or isothiocyanate monomers and polythiols monomers.

The mixture polythiol/polyiso(thio)cyanate from which prepolymer B is obtained may comprise 0 to 30% by weight of at least one polyol. Preferably, no polyol is used.

Polymerization methods are classical, however the amounts of polyisocyanate or isothiocyanate monomers and polythiol monomers in the reaction medium shall be adapted in each case in such a way that the NCX/SH ratio for the mixture polyisocyanate or isothiocyanate/polythiol monomers is ranging from 4:1 to 30:1, preferably 6:1 to 10:1 for the obtention of component A and the SH/NCX ratio for the mixture is ranging from 4:1 to 30:1, preferably 6:1 to 10:1 for the obtention of component B. Typically, components A and B can be prepared through classical thermal polymerization including induction and infra-red heating.

Preferably, both components A and B are prepared without the use of a catalyst system since it allows better control of the polymerization reaction and results in prepolymers of high stability in time, which can be safely stored.

However, they can be prepared using a catalyst or catalyst system as described above.

Preparation of prepolymer having thiol end groups have already been described in U.S. Pat. No. 5,908,876. Similar process can be used to prepare components B of the present invention.

Component A of the present invention can be prepared in a similar manner but with the required ratio of polyisocyanate or isothiocyanate and polythiol monomers in order to obtain polythiourethane prepolymer having isocyanate or isothiocyanate end groups.

Thus, the present invention concerns a method of making a polythiourethane prepolymer having isocyanate or isothiocyanate end groups and a viscosity at 25° C. ranging from 0.02 Pa.s to 0.4 Pa.s which comprises reacting at least one polyisocyanate or isothiocyanate monomer and at least one polythiol monomer in a proportion such that the molar ratio of isocyanate or isothiocyanate groups to thiol groups NCX/SH ranges from 4:1 to 30:1, preferably in the absence of a catalyst.

Similarly, the present invention concerns a method for making a polythiourethane prepolymer having thiol end groups and a viscosity at 25° C. ranging from 0.2 to 2.0. Pa.s, comprising reacting at least one polyisocyanate or isothiocyanate monomer and at least one polythiol monomer in a proportion such that the molar ratio of the thiol groups to the isocyanate or isothiocyanate groups SH/NCX ranges from 4:1 to 30:1, preferably in the absence of a catalyst.

The polyisocyanate or isothiocyanate useful for making the prepolymer components A and B can be any polyisocyanate or isothiocyanate monomer having two or more isocyanate or isothiocyanate functions per molecule, preferably two or three isocyanate or isothiocyanate functions and more preferably two isocyanate or isothiocyanate functions.

The preferred polyisocyanate or isothiocyanate monomers are those having the formulae:

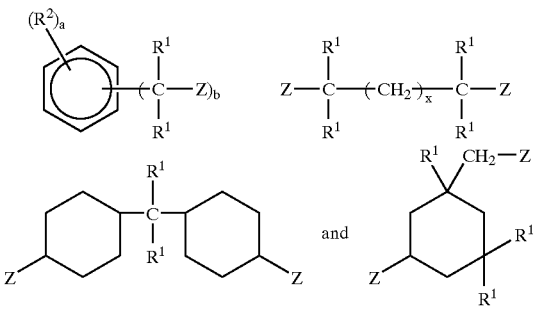

wherein $R^1$ is independently H or a $C_1$–$C_5$ alkyl group, preferably $CH_3$ or $C_2H_5$;

$R^2$ is H, an halogen, preferably Cl or Br, or a $C_1$–$C_5$ alkyl group, preferably $CH_3$ or $C_2H_5$;

Z is —N=C=X, with X being O or S, preferably O;

a is an integer ranging from 1 to 4, b is an integer ranging from 2 to 4 and a+b≦6; and x is an integer from 1 to 10, preferably 1 to 6.

Among the preferred polyisocyanate or isothiocyanate monomers there may be cited tolylene diisocyanate or diisothiocyanate, phenylene diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphtalene diisocyanate or diisothiocyanate, isophorone diisocyanate or diisothiocyanate, bis(isocyanate or diisothiocyanate methyl) cyclohexane, hexamethylene diisocyanate or diisothiocyanate and dicyclohexylmethane diisocyanate or diisothiocyanate.

There can be used a single polyisocyanate or isothiocyanate monomer or a mixture thereof.

The polythiol monomer may be any suitable polythiol having two or more, preferably two or three thiol functions.

The polythiol monomers can be represented by formula:

in which n' is an integer from 2 to 6 and preferably 2 to 3, and R' is an organic group of valency equal to n'.

Useful polythiol monomers are those disclosed in EP-A-394.495 and U.S. Pat. No. 4,775,733 and the polythiols corresponding to the following formulas:

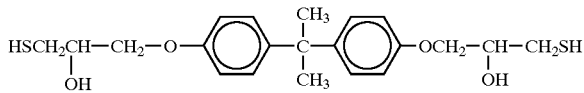

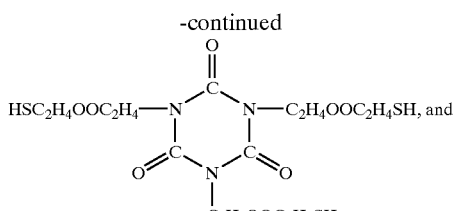

C₂H₅C(CH₂COOCH₂CH₂SH)₃

Among the preferred polythiol monomers there may be cited aliphatic polythiols such as pentaerythritol tetrakis mercaptoproprionate, 1-(1'mercaptoethylthio)-2,3-dimercaptopropane, 1-(2'-mercaptopropylthio)-2,3-dimercaptopropane, 1-(-3'mercaptopropylthio)-2,3 dimercaptopropane, 1-(-4'mercaptobutylthio)-2,3 dimercaptopropane, 1-(5'mercaptopentylthio)-2,3 dimercapto-propane, 1-(6'-mercaptohexylthio)-2,3-dimercaptopropane, 1,2-bis(-4'-mercaptobutylthio)-3-mercaptopropane, 1,2-bis(-5'mercaptopentylthio)-3-mercaptopropane, 1,2-bis(-6'-mercaptohexyl)-3-mercaptopropane, 1,2,3-tris(mercaptomethylthio)propane, 1,2,3-tris(-3'-mercaptopropylthio)propane, 1,2,3-tris(-2'-mercaptoethylthio)propane, 1,2,3-tris(-4'-mercaptobutylthio) propane, 1,2,3-tris(-6'-mercaptohexylthio)propane, methanedithiol), 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

The most preferred polythiol is 3-(2-sulfanylethylthio)-2-(2-sulfanylethylthio)propane-1-thiol.

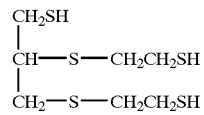

Preferably the polythiols have a viscosity at 25° C. of 2.10⁻¹ Pa.s or less, most preferably 10⁻¹ Pa.s or less and ideally of 0.5.10⁻¹ Pa.s or less.

The following examples illustrate the preparation of prepolymer components A and B.

Preparation of Polythiourethane Prepolymer Having Isocyanate end Groups (Component A)

In a reactor equipped with a condenser, a thermal probe and an agitator there is charged a determined amount of xylylene diisocyanate (XDI). The polyisocyanate monomer is then heated up to 115° C. Then, 3-(2-sulfanylethylthio)-2-(2-sulfanylethylthio)propane-1-thiol. is introduced and mixed with the polyisocyanate in an amount such that the molar ratio of the isocyanate functions to the thiol functions $$\frac{NCO}{SH}$$

is 6:1.

After heating between 3 to 4.5 hours the reaction is complete.

Prepolymer is then cooled and when prepolymer temperature reaches 35° C. (+/−5° C.), the prepolymer is transferred into an appropriate drum, tapped with inert gas (nitrogen or argon) and stored in a cold room.

Final prepolymer with isocyanate end groups (component A) has a viscosity at 25° C. of 0.219 Pa.s.

Preparation of Polythiourethane Prepolymer Having Thiol End Groups (Component B)

In a reactor equipped with a condenser, a thermal probe and an agitator there is charged a determined amount of 3-(2-sulfanylethylthio)-2-(2-sulfanylethylthio) propane-1-thiol.

The polythiol monomer is then heated to 90° C. Then, xylylene diisocyanate (XDI) is introduced and mixed with the polythiol in an amount such that the molar ratio of the thiol groups to the isocyanate groups $$\frac{SH}{NCO}$$

is 8:1.

Reaction is completed within 3 hours. End of reaction is indicated by temperature reaching a peak and returning to 90° C. (+/−2° C.).

Prepolymer is then cooled and when prepolymer temperature reaches 35° C. (+/−5° C.), the prepolymer is transferred to an appropriate drum, topped with inert gas (nitrogen or argon) and stored in a cold room.

Final prepolymer with thiol end groups (component B) has a viscosity at 25° C. of 0.543 Pa.s.

EXAMPLE 1

Prepolymer components A and B are prepared without the use of catalyst, as described above, using the proportions and conditions indicated in Table I below.

A catalyst solution comprising 0.176 g of 18-crown-6, 0.044 g of KSCN and 0.293 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II.

EXAMPLE 2

Prepolymer components A and B are prepared without the use of catalyst, as described above, using the proportions and conditions indicated in Table I below:

A catalyst solution comprising 0.208 g of 18-crown-6, 0.052 g of KSCN and 0.347 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II.

EXAMPLE 3

Prepolymer components A and B are prepared without the use of catalyst, as described above, using the proportions and conditions indicated in Table I below:

A catalyst solution comprising 0.192 g of 18-crown-6, 0.048 g of KSCN and 0.320 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II

EXAMPLE 4

Prepolymer components A and B are prepared without the use of catalyst, as described above, using the proportions and conditions indicated in Table I below:

A catalyst solution comprising 0.191 g of 18-crown-6, 0.048 g of KSCN and 0.318 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II

EXAMPLE 5

Prepolymer components A and B are prepared without the use of catalyst, as described above, using the proportions and conditions indicated in Table I below:

A catalyst solution comprising 0.190 g of 18-crown-6, 0.048 g of KSCN and 0.317 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II

COMPARATIVE EXAMPLES C1 TO C4

Prepolymer components A and B are prepared without the use of catalyst, as described above, using the proportions and conditions indicated in Table I below:

A catalyst solution comprising 0.184 g of 18-crown-6, 0.045 g of KSCN and 0.3 g of thioethanol was then added to component B.

Components A and B are then mixed in a vial as indicated in Table I and polymerized in the presence of the above catalyst. Gelation is less than 10 minutes at room temperature, then the reaction is completed in an air oven at 135° C. for 2 hours.

The presence of striation and/or bubbles in the resulting polymers was determined visually.

The results are given in Table II

TABLE I

| | COMPONENT A | | | COMPONENT B | | | | A and B Viscosity at 25° C. (Pa.s) Just after mixing |
|---|---|---|---|---|---|---|---|---|
| | NCO terminated polythiourethane (g) | Molar ratio NCO/SH | Viscosity at 25° C. (Pa.s) | SH terminated polythiourethane (g) | XDI (g) | Molar ratio SH/NCO | Viscosity at 25° C. (Pa.s) | |
| C1 | 52.083 | — | 0.005 | 48.02 | 0 | — | 0.055 | 0.025 |
| C2 | 41.871 | — | 0.005 | 48.02 | 10.21 | 5.1 | 2.4 | 0.060 |
| C3 | 43.3445 | — | 0.005 | 48.02 | 10.28 | 6.0 | 1.25 | 0.035 |
| C4 | 45.3105 | — | 0.005 | 48.02 | 6.77 | 7.7 | 0.493 | 0.028 |
| EX. 1 | 10 | 6 | 0.219 | 8.64 | — | 8 | 0.543 | 0.310 |
| EX 2 | 10.25 | 8 | 0.071 | 10 | — | 6 | 1.6 | 0.245 |
| EX 3 | 10 | 6 | 0.219 | 9.44 | — | 6 | 1.6 | 0.475 |
| EX 4 | 10 | 8 | 0.071 | 9.39 | — | 8 | 0.543 | 0.157 |
| EX 5 | 10 | 10 | 0.034 | 9.36 | — | 10 | 0.293 | 0.079 |

TABLE II

| | Viscosity of mixture at 25° C. (Pa.s) | Striations | Bubbles |
|---|---|---|---|
| C1 | 0.025 | ++++ | ++++ |
| C2 | 0.060 | ++ | +++ |
| C3 | 0.035 | ++ | +++ |
| C4 | 0.028 | +++ | + |
| Ex. 1 | 0.310 | + | ++ |
| Ex. 2 | 0.245 | ++ | + |
| Ex. 3 | 0.475 | ++ | ++ |
| Ex. 4 | 0.157 | 0 | 0 |
| Ex. 5 | 0.079 | + | 0 |

| Classification | | Number of visible bubbles |
|---|---|---|
| 0 | no defect | 0 |
| + | light | less than 3 |
| ++ | medium | 3 to 10 |
| +++ | strong | 10 to 20 |
| ++++ | very strong | too many bubbles to be counted |

The presence of striations in the polymers was determined visually:
by naked eye inspection;
by using an arc lamp, and classified as follows:

| Classification | Defect(Striation) visible by the naked eye | Defect(Striation) visible by an arc lamp |
|---|---|---|
| 0 | no | no |
| + | no | Very few and small striations |
| ++ | no | yes |
| +++ | Few striations | yes |
| ++++ | Yes(numerous striations) | yes |

The results show that by using two prepolymers according to the invention there is obtained a solid polythiourethane substrate free of defects or very few defects whereas directly polymerizing the monomers (comparative example C1) leads to a substrate having heavy striations and/or bubbles. They also show that, even by polymerizing a prepolymer having thiol end groups with a polyisocyanate monomer the resulting substrate still exhibits striations and bubbles.

All viscosity measurements are made with the same viscosimeter (Brookfield LVDVI) and following the same protocole using S 18 spindle for monomers, prepolymers and their mixtures of low viscosity (20 to 1000 cP and up to 5000 cP).

Selection of spindle is made as follows:
For any given spindle/speed combination, the maximum range is equal to the spindle factor multiplied by 10.
For the spindle S 18, sample size is 8.0 ml and spindle factor is 30/N where N is the spindle speed (rpms).
Thus, using S 18 spindle at 2.5 rpms the spindle factor will be 30/2.5=12 and the viscosity range 120 to 1200 cP (centipoises).

Range efficiency (%) corresponds to the ratio of the measured viscosity for the sample divided by the maximum range and multiplied by 100. The higher the range efficiency, the more accurate is the viscosity measurement. Acceptable range efficiency is 10 to 99%.

Optimization of spindle speed may be effected as follows:
Assuming that at a spindle speed of 1.5 rpms the range efficiency is only 33.8%, doubling the spindle speed to 3.0 rpms would give a range efficiency of 67.6%. Further increasing the spindle speed from 3.0 to 4.0 rpms would give a 25% increase of the range efficiency to 84.5%. But an increase of spindle speed from 4.0 to 5.0 rpms would give a 20% increase of the range efficiency to 101.4 which is an error (reading exceeds the 100% limit). Therefore, the viscosity measurements will be taken at a speed of 4.0 rpms with approximately a 84.5% range efficiency.

All viscosity measurements are made at 25° C.

What is claimed is:
1. A method of fast curing polythiourethane transparent casted substrate, usable for making optical articles such as ophthalmic lenses, which comprises the steps of:
   1) Providing a first component A comprising a polythiourethane prepolymer having isocyanate or isothiocyanate (NCX where X is O or S) end groups and a viscosity at 25° C. ranging from 0.02 to 0.4 Pa.s;
   2) Providing a second component B comprising a polythiourethane prepolymer having thiol (SH) end groups and a viscosity at 25° C. ranging from 0.2 to 2.0 Pa.s;
   3) Mixing together first and second components A and B and filling a moulding cavity of a casting mould assembly with the resulting mixture;
   4) Curing said mixture to obtain a transparent solid substrate, said curing step comprising:
      a) a first step for polymerizing said mixture to obtain a gel within 1 to 10 minutes; and
      b) a second step of post-curing the gel to obtain the transparent solid substrate; and
   5) Recovering the transparent solid substrate from the mould.

2. The method of claim 1, wherein components A and B are obtained by polymerizing at least one polyisocyanate or polyisothiocyanate monomer and at least one polythiol monomer.

3. The method of claim 2, wherein the amounts of polyisocyanate or polyisothiocyanate monomers and polythiol monomers are adapted so that the ratio NCX/SH for the mixture of polyisocyanate or isothiocyanate monomers and polythiol monomers is ranging from 4:1 to 30:1 for the obtention of component A and the ratio SH/NCX for the mixture of polyisocyanate or isothiocyanate monomers and the polythiol monomers is ranging from 4:1 to 30:1 for the obtention of component B.

4. The method of claim 3, wherein the NCX/SH and SH/NCX ratios are ranging from 6:1 to 10:1.

5. The method of claim 1, wherein the gel is obtained within 1 to 10 minutes.

6. The method of claim 1, wherein the mixture of components A and B has a viscosity at 25° C. ranging from 0.1 to 0.3 Pa.s.

7. The method of claim 1, wherein the curing step (4) is effected in the presence of a catalyst.

8. The method of claim 1, wherein a catalyst is added to component B prior to mixture with component A.

9. The method of claim 1, wherein a catalyst is added to the mixture of components A and B.

10. The method of claim 2, wherein polymerization of the monomers is performed in the absence of a catalyst.

11. The method of claim 2, wherein the polythiol has formula:

$$R'(SH)_{n'}$$

in which n' is an integer from 2 to 6 and R' is an organic group of valency equal to n'.

12. The method of claim 11, wherein the polythiol is selected from the group consisting of pentaerythritol tetrakis mercaptoproprionate, 1-(1'mercaptoethylthio)-2,3-dimercaptopropane, 1-(2'-mercaptopropylthio)-2,3-dimercaptopropane, 1-(-3'mercaptopropylthio)-2,3dimercaptopropane, 1-(-4'mercaptobutylthio)-2,3 dimercaptopropane, 1-(5'mercaptopentylthio)-2,3 dimercapto-propane, 1-(6'-mercaptohexylthio)-2,3-dimercaptopropane, 1,2-bis(-4-mercaptobutylthio)-3-mercaptopropane, 1,2-bis(-5'mercaptopentylthio)-3-mercaptopropane, 1,2-bis(-6'-mercaptohexyl)-3-mercaptopropane, 1,2,3-tris(mercaptomethylthio)propane, 1,2,3-tris(-3'-mercaptopropylthio)propane, 1,2,3-tris(-2'-mercaptoet hylthio)propane, 1,2,3-tris(-4'-mercaptobutylthio) propane, 1,2,3-tris(-6'-mercaptohexylthio)propane, methanedithiol, 1,2-ethanedithiol, 1,1-propanedithiol, 1,2-propanedithiol, 1,3-propanedithiol, 2,2-propanedithiol, 1,6-hexanethiol-1,2,3-propanetrithiol, and 1,2-bis(-2'-mercaptoethylthio)-3-mercaptopropane.

13. The method of claim 11, wherein the polythiol is:

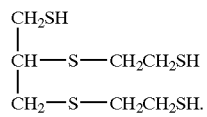

14. The method of claim 2, wherein the polyisocyanate or polyisothiocyanate is selected from monomers of formulas:

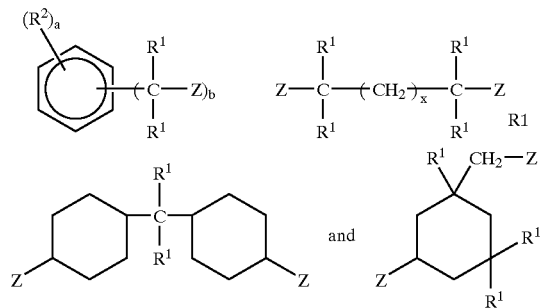

wherein
- $R^1$ is independently H or a $C_1$–$C_5$ alkyl group;
- $R^2$ is H, an halogen, or a $C_1$–$C_5$ alkyl group;
- Z is —N=C=X where X is O or S;
- a is an integer ranging from 1 to 4, b is an integer ranging from 2 to 4 and a+b≦6; and
- x is an integer from 1 to 10.

15. The method of claim 14, wherein x is an integer from 1 to 6.

16. The method of claim 14, wherein the polyisocyanate or isothiocyanate is selected from the group consisting of tolylene diisocyanate or diisothiocyanate, phenylene, diisocyanate or diisothiocyanate, ethylphenylene diisoocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphtalene diisocyanate or diisothiocyanate, isophorone diisocyanate or diisothiocyanate, bis(isocyanate or isothiocyanate methyl) cyclohexane, hexamethylene diisocyanate or diisothiocyanate and dicyclohexylmethane diisocyanate or diisothiocyanate.

17. The method of claim 14, wherein the polyisocyanate is xylylene diisocyanate.

18. The method of claim 11, wherein n' is an integer from 2 to 3.

19. The method of claim 14, wherein $R^1$ is a $C_1$–$C_5$ alkyl group and wherein the $C_1$–$C_5$ alkyl group is $CH_3$ or $C_2H_5$.

20. The method of claim 14, wherein $R^2$ is a halogen and wherein the halogen is Cl or Br.

21. The method of claim 14, wherein $R^2$ is a $C_1$–$C_5$ alkyl group and wherein the $C_1$–$C_5$ alkyl group is $CH_3$ or $C_2H_5$.

22. The method of claim 14, wherein x is an integer from 1 to 6.

* * * * *

UNITED STATES PATENT AND TRADEMARK OFFICE
CERTIFICATE OF CORRECTION

PATENT NO. : 6,887,401 B2
DATED : May 3, 2005
INVENTOR(S) : Keita et al.

It is certified that error appears in the above-identified patent and that said Letters Patent is hereby corrected as shown below:

<u>Title page,</u>
Item [*] Notice, should read
-- [*] Notice:  Subject to any disclamer, the term of this
patent is extended or adjusted under 35
U.S.C. 154(b) by 428 days. --

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,887,401 B2
DATED : May 3, 2005
INVENTOR(S) : Keita et al.

It is certified that error appears in the above-identified patent and that said Letters Patent is hereby corrected as shown below:

Column 12,
Line 52, please delete "3dimercaptopropane" and insert -- 3 dimercaptopropane --.
Line 60, please delete "mercaptoet hylthio" and insert -- mercaptoethylthio --.

Column 13,
Line 26, please delete "an halogen" and insert -- a halogen --.

Column 14,
Line 4, please delete "diisoocyanate" and insert -- diisocyanate --.

Signed and Sealed this

Twenty-ninth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,887,401 B2  Page 1 of 1
DATED : May 3, 2005
INVENTOR(S) : Keita et al.

It is certified that error appears in the above-identified patent and that said Letters Patent is hereby corrected as shown below:

<u>Title page,</u>
Item [*] Notice, delete "by 391 days" and insert -- by 511 days --.

Signed and Sealed this

Eleventh Day of April, 2006

JON W. DUDAS
*Director of the United States Patent and Trademark Office*